INVENTOR
PAUL E. LOVEDAY
BY
ATTORNEY

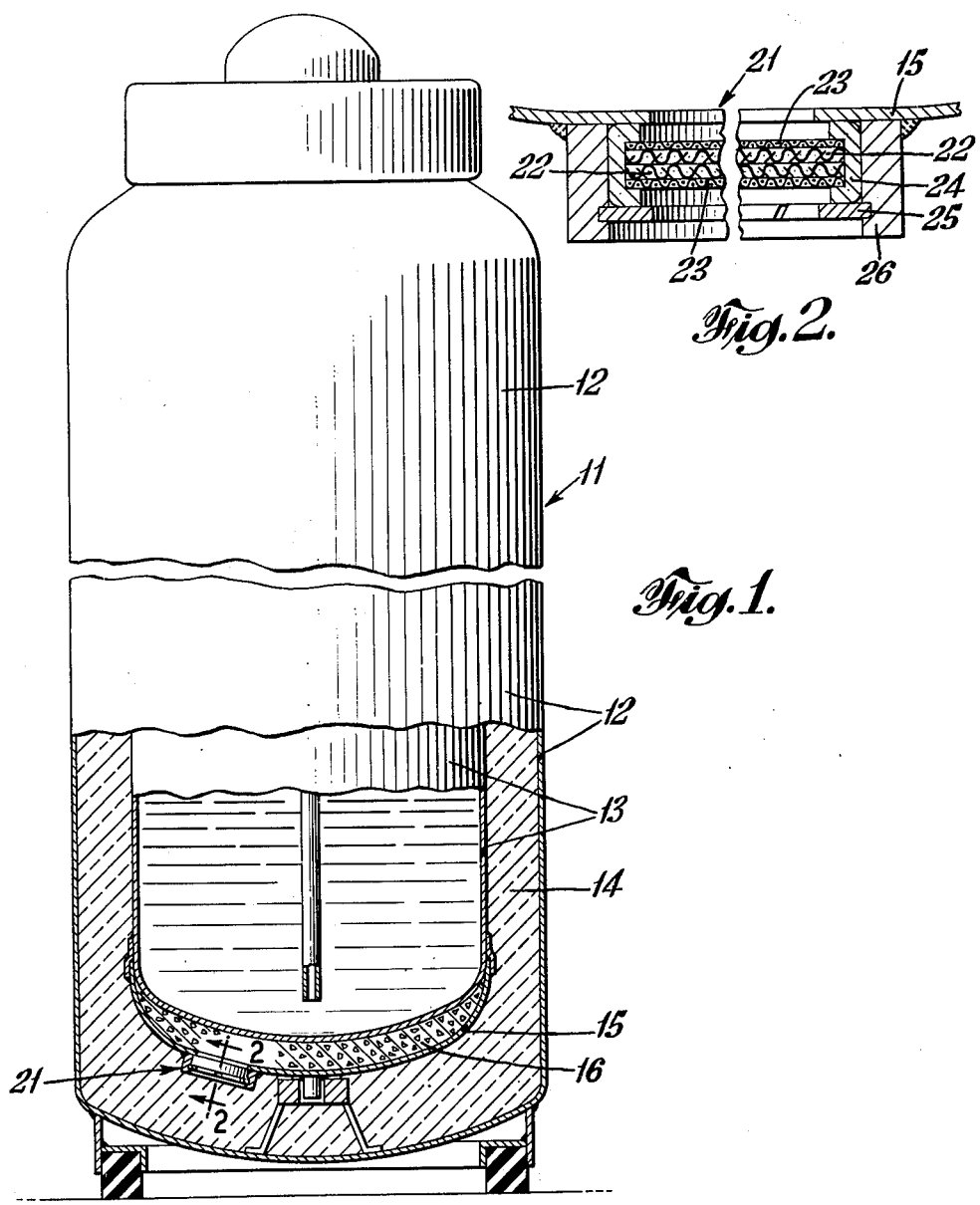

INVENTOR
PAUL E. LOVEDAY
BY
Jackson B Browning
ATTORNEY

UNITED STATES PATENT OFFICE

2,900,800
METHOD AND APPARATUS FOR MAINTAINING EFFICIENCY OF VACUUM INSULATION

Paul E. Loveday, Kenmore, N.Y., assignor to Union Carbide Corporation, a corporation of New York Application January 5, 1956, Serial No. 557,477

11 Claims. (Cl. 62—45)

This invention relates to the insulation of containers and particularly to maintaining the efficiency of vacuum insulation of containers for liquid oxygen and other materials conventionally stored or transported at predetermined low temperatures.

The problem of maintaining articles, and particularly fluids, at low temperatures for prolonged periods of time has long been the subject of investigation. Various types of insulation have been suggested and many different types have been proposed and tested in an effort to eliminate the transfer of heat from a relatively hot zone to a relatively cold zone. Among the most effective arrangements so far devised is that of providing a vacuum chamber around the chamber to be insulated.

While in many cases exceedingly good results have been obtained with the materials and methods of the prior art, the continuing problem for this type of insulation is obtaining a high vacuum initially and maintaining this level of vacuum during the required insulation period. This objective is complicated by the unavoidable presence of air-water traces in the vacuum space. Furthermore if a powder-vacuum insulation system as disclosed in United States Patent No. 2,396,459, L. I. Dana, is used, moisture traces will be introduced with the fine powder. The effect of air-water traces on the insulating quality is illustrated by the following: the thermal conductivity of a conventional insulating material at 50 microns absolute pressure is approximately 0.0016 B.t.u./hour, sq. ft. ° F./ft. If the presence of air-water traces in this insulation causes the absolute pressure to rise tenfold, to 500 microns, the thermal conductivity will increase to approximately 0.0054 B.t.u./hour, sq. ft. ° F./ft. This represents more than a threefold increase in the heat transferred through the insulation. The same problem of maintaining insulating quality exists when radiation shields are used instead of powder in which case the level of vacuum is much higher, for example, 0.01 to 0.1 micron absolute pressure.

It is the principal object of the present invention to provide a method and a means whereby the adverse effects of moisture or other gases on thermal insulations may be minimized. Another object of the invention is to provide insulated containers wherein the effectiveness of vacuum insulation is not materially impaired by the presence of moisture or air. Still another object of the invention is to provide a container having a vacuum insulation wherein the integrity of the vacuum is not destroyed or substantially impaired by the presence of moisture in the vacuum chamber.

A further object is to provide a container in which air-water traces in the insulating section can be more efficiently removed during the initial cooling of the container to provide a higher initial vacuum. Still a further object is to provide a container in which the vacuum in the insulating section is maintained at a high level even when the temperature of the container is increased as when it is empty or the pressure in the container is increased.

The objects of the invention are accomplished by providing within the insulating portion of the apparatus, that is, the compartment designed to house the insulation or the section of the container in which a vacuum is maintained to provide insulation, an adsorbent of the molecular sieve type having strong powers of retention and acquisition for moisture and air. The materials which have been found to be particularly suitable for use in the practice of the invention are natural and synthetic zeolitic molecular sieves having a pore size of at least about five angstrom units. Examples of natural zeolitic molecular sieves for use according to the present disclosure are chabazite and erionite. Suitable synthetic zeolitic molecular sieves are zeolite A and zeolite X which will be described in detail below.

Zeolitic molecular sieves have a three-dimensional framework of $SiO_4$ and $AlO_4$ tetrahedra. The tetrahedra are cross-linked by the sharing of oxygen atoms. The electro-valence of the tetrahedra containing aluminum is balanced by the inclusion in the crystal of a cation, for example sodium or calcium. The spaces between the tetrahedra are occupied by water molecules prior to dehydration or activation as by heating.

The general formula for zeolite A, disclosed in United States patent application Serial No. 400,388, filed December 24, 1953, now U.S. Patent No. 2,882,243, issued April 14, 1959, may be represented as follows:

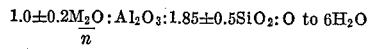

In the formula "M" is a cation and "n" its valence.

The composition of calcium zeolite A, a preferred material for use in the apparatus of the invention, expressed in terms of mol fractions of the oxides of the materials in the zeolite is as follows:

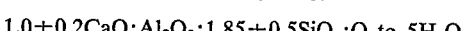

Calcium zeolite A is most conveniently obtained by the ion exchange of the sodium form of zeolite A. This latter is made by holding a homogeneous aqueous solution of the proper ingredients at a temperature of 100° C. in a closed container until the sodium form of the zeolite crystallizes out of the solution. Preferred reactants are sodium aluminate, sodium hydroxide and sodium silicate all in aqueous solution. These materials should preferably be present in such proportions that the following mol ratios prevail:

| | |
|---|---|
| $SiO_2/Al_2O_3$ | 0.5–1.3 |
| $Na_2O/SiO_2$ | 1.0–3.0 |
| $H_2O/Na_2O$ | 35–200 |

The sodium form of zeolite A may be converted to the calcium form by mixing the crystals of sodium zeolite A with an aqueous solution of a calcium salt, e.g. calcium chloride. A part at least of the sodium ions is replaced by the calcium ions. Repeating this procedure increases the number of sodium ions that are replaced by the calcium ions.

In addition to its composition zeolite A can be identified by its X-ray powder diffraction pattern. In obtaining the X-ray powder diffraction pattern standard techniques were employed. The radiation was the $K\alpha$ doublet of copper, and a Geiger counter spectrometer with a strip chart pen recorder was used. The more significant lines of the X-ray diffraction pattern of zeolite A are given in Table A.

TABLE A d Value of reflection in A.

12.2±0.2
8.6±0.2
7.05±0.15
4.07±0.08
3.68±0.07
3.38±0.06
3.26±0.05
2.96±0.05
2.73±0.05
2.60±0.05

Zeolite X, disclosed in United States patent application Serial No. 400,389, filed December 24, 1953, now U.S. Patent 2,882,244, issued April 14, 1959, may be represented as follows:

$$0.9 \pm 0.2 M_{\frac{2}{n}} O : Al_2O_3 : 2.5 \pm 0.5 SiO_2 : O \text{ to } 8H_2O$$

In the formula "M" represents a metal and "n" its valence.

A typical composition for the sodium form of zeolite X may be represented as follows:

$$0.9 Na_2O : Al_2O_3 : 2.5 SiO_2 : 6.1 H_2O$$

Crystallization of zeolite X in the manner described above for the crystallization of zeolite A may be accomplished from a solution containing materials in the following proportions:

| | |
|---|---|
| $SiO_2/Al_2O_3$ | 3–5 |
| $Na_2O/SiO_2$ | 1.2–1.5 |
| $H_2O/Na_2O$ | 35–60 |

Other cations may be introduced into zeolite X by ion exchange in aqueous solutions for example.

The more significant lines of the X-ray diffraction pattern of zeolite X are given in Table B.

TABLE B

*d Value of reflection in A.*

14.42±0.2
8.82±0.1
4.41±0.05
3.80±0.05
3.33±0.05
2.80±0.05
2.79±0.05
2.66±0.05

According to the invention, apparatus is provided wherein a quantity of a zeolitic molecular seive, preferably calcium zeolite A, is retained in the insulating section of the container. For best results the adsorbent material is retained in contact with a cold wall in the insulating section to promote the effectiveness of the adsorbent. Alternatively the adsorbent material may be mixed with the powder in a powder-vacuum insulating system.

The invention will now be described with reference to the accompanying drawing.

In the drawing:

Fig. 1 represents a tank having a vacuum section providing insulation and incorporating the principles of the invention;

Fig. 2 shows a detailed drawing of a preferred adsorbent-filter assembly for the retention of the adsorbent used in the practice of the invention;

Figure 3:
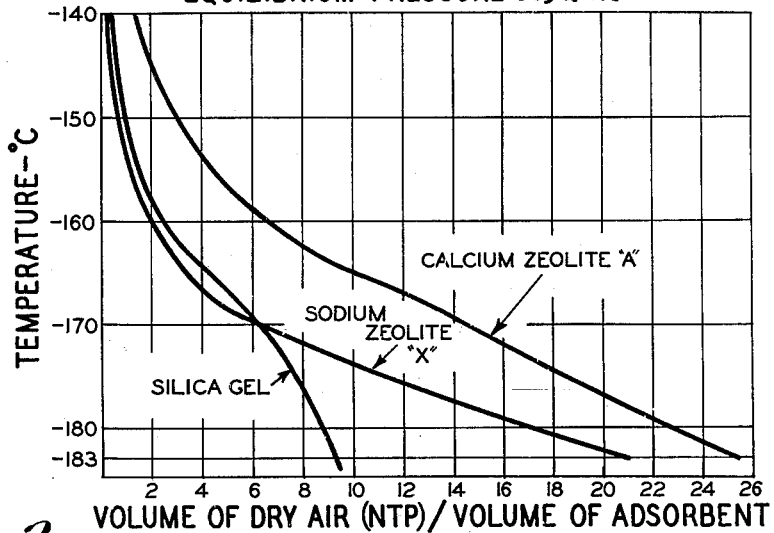
Fig. 3 shows a number of curves indicating the performance of various adsorbents in the presence of dry air.
Figure 4:
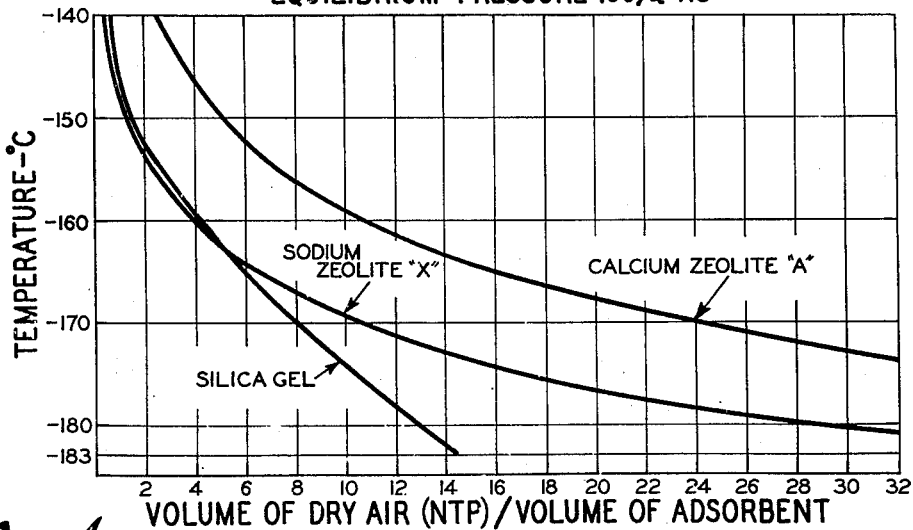
Fig. 4 is a drawing similar to that of Fig. 3 except that the absolute pressure of the vacuum system in which the data for the curves was obtained has been increased.

In more detail, the tank 11 comprises an outer container 12 and an inner container 13. The insulating chamber 14 between the two containers is adapted to retard the transfer of heat to or from the inner container 13. In the embodiment of the invention shown in the drawing insulating chamber 14 is evacuated. Liquid oxygen, or other material which is to be retained, is placed in container 13. A disk 15, for example of copper, having good heat-conducting properties is placed in the chamber 14 and forms with the wall of container 13 a space for the adsorbent 16. The adsorbent 16 and the insulating chamber 14 are connected by an opening in disk 15. In the preferred container the opening is provided with a filter such as the filter assembly 21 shown in Fig. 2. In the filter assembly 21, glass cloth 22 is held between pieces of wire screen 23 by a crimped copper tube 24. A split ring 25 holds the copper tube 24 inside a ring 26 mounted on disk 15. With the arrangement described above and illustrated in the drawing, a high degree of vacuum within the chamber 14 is possible if the usual precautions for making and operating this type of container are observed.

The effectiveness of zeolitic molecular sieves and particularly calcium zeolite A in eliminating traces of moisture and air from the insulation chamber is demonstrated by the curves Figs. 3–8.

In Fig. 3 the volume of dry air at normal temperature and pressure per volume of adsorbent has been plotted against the temperature at which adsorption data was measured. From the data it can be seen that the capacity of the molecular sieves calcium zeolite A and sodium zeolite X per unit of volume at temperatures generally encountered in apparatus of the type described greatly exceeds that of silica gel, a common adsorbent. The data in Fig. 3 was taken at an equilibrium pressure of 50 microns. From Fig. 4 it can be seen that the same relative performance of the three materials is obtained with 100 microns pressure in the system.

Figure 6:
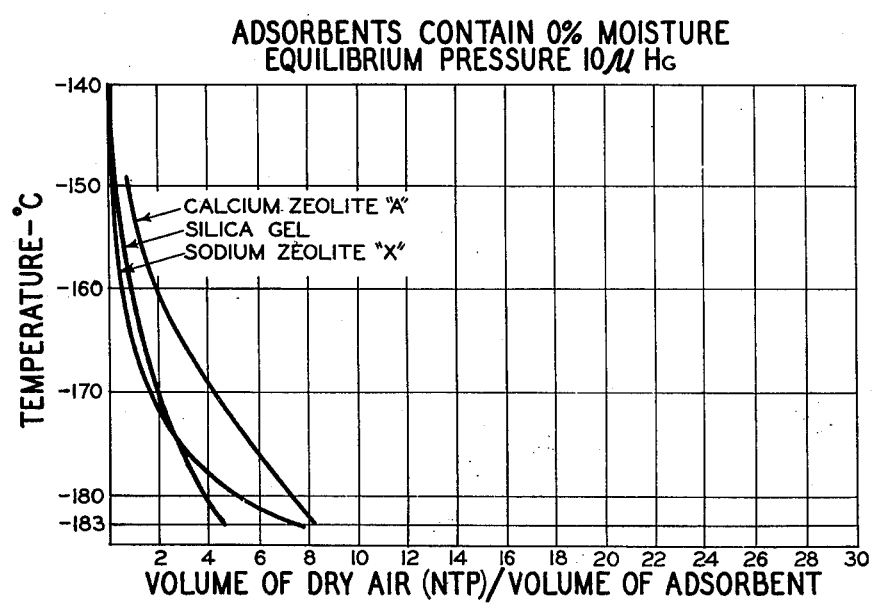
Figs. 6, 7 and 8 show a number of curves similar to those of Fig. 3 except for a difference in pressure in the systems in which the data was obtained.
Figure 7:
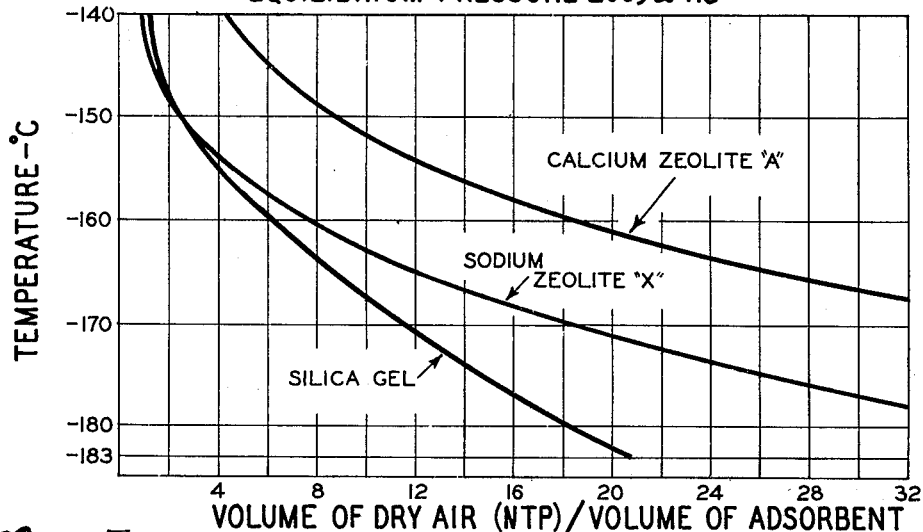
Figure 8:
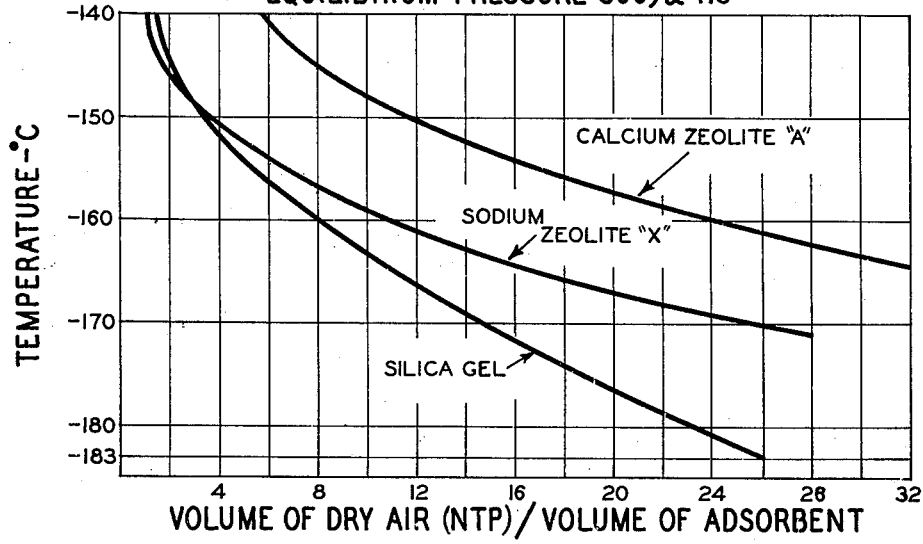

Figs. 6, 7 and 8 showing curves drawn from data obtained at 10, 200 and 300 microns' pressure, respectively, are further evidence of the superior properties of the zeolitic molecular sieves as scavengers.

Figure 5:
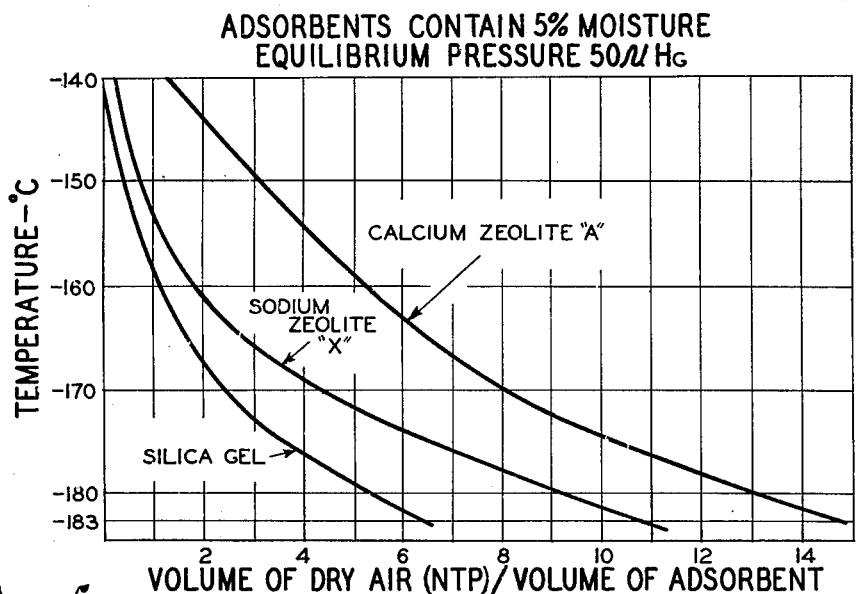
Fig. 5 shows a series of curves similar to those of Fig. 3 except that the data from which the curves was obtained was compiled with moisture-containing adsorbents.

In the tests summarized in Fig. 5 the adsorbents tested were treated with moisture. In this series of tests moisture amounting to 5% of the weight of the adsorbent was added. The capacity of the materials for dry air was tested under these circumstances and, as can be seen from the curves, the molecular sieves retained a substantial capacity for dry air even in the presence of the moisture. These tests clearly demonstrate the effectiveness of the molecular sieves in maintaining a vacuum.

The improved performance of zeolitic molecular sieves in the removal from an insulating chamber of small traces of air and moisture greatly increases the effectiveness and dependability of insulation. This increased capacity reduces to a minimum the maintenance required on equipment employing vacuum and other insulation. It will be understood that the containers in which calcium zeolite A and the other suitable zeolitic molecular sieves may be effectively used may be modified greatly within the scope of the invention. Likewise the number of applications of the vacuum insulated tanks is not to be limited to a liquid oxygen tank but rather would apply equally well to a variety of tanks including railroad tank cars and tanks for other materials stored at low temperature.

What is claimed is:

1. In an apparatus for the maintenance of a material in a predetermined temperature range wherein the material is stored within one container which container is substantially enclosed in a second container and a vacuum is maintained in the space between the two containers, the improvement which comprises a quantity of at least one crystalline zeolitic molecular sieve having pores of at least about 5 angstrom units in size within said space between said two containers.

2. An apparatus in accordance with claim 1 wherein said crystalline zeolitic molecular seive is selected from the group consisting of calcium zeolite A, sodium zeolite X, chabazite and erionite.

3. In an apparatus for the maintenance of a material in a predetermined temperature range wherein the material is stored within one container which container is substantially enclosed in a second container and a vacuum is maintained in the space between the two containers, the improvement which comprises a quantity of calcium zeolite A within said space between said two containers.

4. In an apparatus for the maintenance of a material in a predetermined temperature range wherein the material is stored within one container which container is substantially enclosed in a second container and a vacuum is maintained in the space between the two containers, the improvement which comprises a quantity of a mixture of an insulating powder and at least one crystalline zeolitic molecular sieve having pores of at least about 5 angstrom units in size within said space between said two containers.

5. An apparatus in accordance with claim 4 wherein said crystalline zeolitic molecular sieve is selected from the group consisting of calcium zeolite A, sodium zeolite X, chabazite and erionite.

6. In an apparatus for the maintenance of a material in a predetermined temperature range wherein the material is stored within one container which container is substantially enclosed in a second container and a vacuum is maintained in the space between the two containers, the improvement which comprises a quantity of a mixture of an insulating powder and calcium zeolite A within said space between said two containers.

7. In an apparatus for the maintenance of a material in a predetermined temperature range wherein the material is stored within one container which container is substantially enclosed in a second container and a vacuum is maintained in a space between the two containers, the improvement which comprises a quantity of at least one crystalline zeolitic molecular sieve having pores of at least about 5 angstrom units in size within said space between said two containers and in contact with the colder of the two said containers.

8. An apparatus in accordance with claim 7 wherein said crystalline zeolitic molecular sieve is selected from the group consisting of calcium zeolite A, sodium zeolite X, chabazite and erionite.

9. In an apparatus for the maintenance of a material in a predetermined temperature range wherein the material is stored within one container which container is substantially enclosed in a second container and a vacuum is maintained in the space between the two containers, the improvement which comprises a quantity of calcium zeolite A within said space between said two containers and in contact with the colder of the two said containers.

10. In a process for storing a liquefied gas in a storage tank, said storage tank comprising an inner container, an outer container substantially enclosing said inner container and an insulating chamber between said two containers, the improvement which comprises: providing a quantity of crystalline zeolitic molecular sieve having pores of at least about 5 angstrom units in size within said insulating chamber and in contact with said inner container; evacuating said insulating chamber to an initial vacuum; thereafter introducing the liquefied gas into said inner container to cool said inner container and said molecular sieve to substantially the storage temperature of said gas, thereby improving the initial vacuum by adsorbing on said molecular sieve traces of air and moisture from within said insulating chamber.

11. Process in accordance with claim 10 wherein said crystalline zeolitic molecular sieve is calcium zeolite A.

References Cited in the file of this patent

UNITED STATES PATENTS

| | | |
|---|---|---|
| 1,694,967 | Coolidge | Dec. 11, 1928 |
| 1,728,732 | Jaeger | Sept. 17, 1929 |
| 1,922,416 | Block | Aug. 15, 1933 |
| 2,453,930 | Paul et al. | Nov. 16, 1948 |
| 2,677,938 | Loveday | May 11, 1954 |

OTHER REFERENCES

Mellor: "A Comprehensive Treatise on Inorganic and Theoretical Chemistry," published by Longmans, Green and Company (1947 edition), volume VI, pages 575–576 relied on.